(12) United States Patent
Kim et al.

(10) Patent No.: US 11,760,192 B2
(45) Date of Patent: Sep. 19, 2023

(54) SYSTEM FOR CONTROLLING SHUT-OFF OF A FUEL PUMP NOZZLE IN FILLING A FUEL TANK

(71) Applicants: HYUNDAI MOTOR COMPANY, Seoul (KR); KIA CORPORATION, Seoul (KR)

(72) Inventors: Keun Soo Kim, Anyang-si (KR); Dong Hyun Kim, Hwaseong-si (KR); Jung Hoon Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/956,142

(22) Filed: Sep. 29, 2022

(65) Prior Publication Data
US 2023/0104603 A1    Apr. 6, 2023

(30) Foreign Application Priority Data
Oct. 5, 2021    (KR) ......................... 10-2021-0131763

(51) Int. Cl.
*B60K 15/04*    (2006.01)
*B67D 7/48*    (2010.01)

(52) U.S. Cl.
CPC ............... *B60K 15/04* (2013.01); *B67D 7/48* (2013.01); *B60K 2015/0458* (2013.01)

(58) Field of Classification Search
CPC .......... B60K 15/04; B60K 2015/03557; B60K 2015/03552; B60K 2015/03595; B60K 15/03504; B60K 15/03519; B60K 2015/03576; F02M 37/025
See application file for complete search history.

(56) References Cited

U.S. PATENT DOCUMENTS

| | | | | |
|---|---|---|---|---|
| 5,244,022 A | * | 9/1993 | Gimby | B60K 15/03504 141/50 |
| 2007/0169845 A1 | * | 7/2007 | Benjey | F02M 37/0082 141/350 |
| 2007/0289664 A1 | * | 12/2007 | Peterson | F02M 37/20 141/126 |
| 2009/0000668 A1 | * | 1/2009 | Roscher | B60K 15/03504 137/202 |
| 2011/0186571 A1 | * | 8/2011 | Burkholder | B65D 90/24 220/86.1 |
| 2012/0305134 A1 | * | 12/2012 | O'Connor | B67D 7/42 141/285 |

* cited by examiner

*Primary Examiner* — Timothy P. Kelly
(74) *Attorney, Agent, or Firm* — LEMPIA SUMMERFIELD KATZ LLC

(57) ABSTRACT

A system for controlling shut-off of a fuel pump nozzle in a fuel tank includes: a fuel evaporation gas blocking unit configured to separate an outer space of a fuel injection part of the fuel pump nozzle inserted inside the filler pipe into a first space into which external air is introduced and a second space into which fuel evaporation gas that is discharged from the fuel tank is introduced and to block the evaporation gas from being introduced into the first space; an external air suction jet pump mounted in the fuel tank and configured to suck external air thereinto and discharge the external air into the fuel tank, by receiving a portion of fuel transmitted from the fuel pump in the fuel tank as a working fluid; and a jet pump connection hose configured to connect the first space and the external air suction jet pump.

16 Claims, 6 Drawing Sheets

SYSTEM FOR CONTROLLING SHUT-OFF OF A FUEL PUMP NOZZLE IN FILLING A FUEL TANK

CROSS REFERENCE TO RELATED APPLICATION

This application claims priority to and the benefit of Korean Patent Application No. 10-2021-0131763, filed Oct. 5, 2021, the entire contents of which are incorporated herein by reference.

BACKGROUND

Field

The present disclosure relates to a system for controlling shut-off of a fuel pump nozzle in filling a fuel tank.

Description of the Related Art

In general, a fuel pump nozzle is used when refueling fuel into a fuel tank of a vehicle. The fuel pump nozzle discharges fuel when its lever is pulled and stops discharging fuel when the fuel tank is fully charged.

The fuel pump nozzle detects a full charge of the fuel tank using the negative pressure formed therein when the fuel is discharged. The fuel pump nozzle relieves the negative pressure through the air introduced through a venturi port before the fuel tank is fully charged. When the fuel tank is fully charged, the venturi port is clogged and the negative pressure is formed, thereby allowing the full charge to be detected.

When the fuel tank is fully charged, the fuel of the fuel tank flowing back through the filler pipe clogs the venturi port. As a result, the inflow of the air through the venturi port is stopped, and the negative pressure inside the fuel pump nozzle is no longer relieved, causing shut-off of the fuel pump nozzle.

When operating ordinarily, the fuel pump nozzle continuously sucks the air through the venturi port until its shut-off occurs. When refueling the fuel tank in a room temperature environment, the fuel pump nozzle also sucks fuel evaporation gas discharged to the filler pipe through a leveling pipe of the fuel tank through the venturi port, but the amount of evaporation gas discharged through the filler pipe is not large. Therefore, the fuel pump nozzle does not shut off until the fuel tank is fully charged.

However, we have discovered that when refueling the fuel tank in a high-temperature environment, excessive evaporation fuel gas that comes out of the filler pipe through the leveling pipe of the fuel tank is condensed inside the relatively cold venturi port and blocks the inflow of the air. Accordingly, the negative pressure inside the fuel pump nozzle may not be relieved, so there occurs a problem that the fuel pump nozzle is shut off prematurely before the fuel tank is fully charged.

The premature shut-off phenomenon of the fuel pump nozzle as described above is a problem that frequently occurs when refueling in a high-temperature environment, and when the temperature of the fuel tank is excessively high, refueling may even not be possible.

The foregoing is intended merely to aid in the understanding of the background of the present disclosure, and is not intended to mean that the present disclosure falls within the purview of the related art that is already known to those having ordinary skill in the art.

SUMMARY

Accordingly, the present disclosure has been made keeping in mind the above problems occurring in the related art and is intended to provide a fuel tank shut-off control system that fundamentally prevents the premature shut-off the fuel pump nozzle before the fuel tank is fully charged when refueling the fuel tank.

In addition, the objective of the present disclosure is not limited to the objective mentioned above, and other objectives not mentioned could be clearly understood by those (hereinafter referred to as "person of ordinary skill") of ordinary skill in the art to which the present disclosure belongs from the description below.

In order to achieve the above objective, according to one aspect of the present disclosure, a system for controlling shut-off of a fuel pump nozzle may include: a fuel evaporation gas blocking unit mounted on a filler pipe of a fuel tank and configured to separate an outer side space of a fuel injection part of a fuel pump nozzle inserted into an inside thereof into a first space into which external air is introduced and a second space into which fuel evaporation gas that is discharged from the fuel tank is introduced and to block the fuel evaporation gas from being introduced into the first space; an external air suction jet pump mounted at an inside of the fuel tank and configured to suck external air thereinto and discharge the external air into an inside of the fuel tank, by receiving a portion of fuel transmitted from a fuel pump in the fuel tank as a working fluid; and a jet pump connection hose configured to connect the first space and the external air suction jet pump to each other so that a flow of external air is possible.

According to an embodiment of the present disclosure, the fuel pump may be configured to be driven when the fuel tank is refueled and to transmit the fuel to the external air suction jet pump.

In addition, the external air suction jet pump may be connected to a relief valve provided in the fuel pump so that a flow of the fuel is possible, and the fuel pump may be driven so that the relief valve is opened when a fuel switch is actuated.

In addition, the jet pump connection hose may be installed with a check valve at a rear end thereof, and the check valve may be opened when the relief valve is opened.

In addition, the fuel evaporation gas blocking unit may include: a retainer, which is mounted at an inside of the filler pipe, and which, based on a fuel injection direction of the filler pipe, is, at an upper part thereof, provided with an external air suction hole configured to suck outside air and an evaporation gas venting hole configured to discharge the fuel evaporation gas and is, at a lower side portion thereof, formed with an opening part configured to communicate with the external air suction hole and configured to open a venturi port of the fuel injection part. The fuel evaporation gas blocking unit may further include a partition provided on an outer circumferential surface of the retainer and configured to hermetically surround the first space. In particular, the partition is configured to communicate with the external air suction hole and the opening part, of a space between an inner circumferential surface of the filler pipe and the outer circumferential surface of the retainer, and provided with a fuel inlet hole at a lower end thereof. In addition, the fuel evaporation gas blocking unit may include a premature shut-off prevention valve assembled at an inside of the partition and configured to close the fuel inlet hole until the fuel tank is fully charged and to open the fuel inlet hole by the fuel flowing back from the fuel tank to the filler pipe when the fuel tank is fully charged.

In addition, the fuel pump nozzle may be configured to suck the outside air through the venturi port when the fuel is discharged from the fuel injection part, and the venturi port may directly communicate with the first space through the opening part when the fuel injection part is inserted into the retainer.

In addition, the space between the inner circumferential surface of the filler pipe and the outer circumferential surface of the retainer may be separated into the first space and the second space by the partition, and the second space is a space configured to communicate with the evaporation gas venting hole of a space between the inner circumferential surface of the filler pipe and the outer circumferential surface of the retainer so that the flow of the fuel evaporation gas is possible.

In addition, the first space may be a space configured to communicate with the external air suction hole and the opening part so that the flow of external air is possible.

In addition, the partition may be mounted with a spring support plate on an inner circumferential surface thereof, and a spring member may be disposed between the spring support plate and the premature shut-off prevention valve to press the premature shut-off prevention valve toward the fuel inlet hole.

In addition, a valve latching step configured to support the premature shut-off prevention valve may be provided at a lower end of the partition.

In addition, the spring member may be compressed by the premature shut-off prevention valve that moves to allow the fuel inlet hole to be open when the fuel tank is fully charged.

In addition, the external air suction hole and the evaporation gas venting hole may be disposed to face each other in the circumferential direction of the retainer.

In addition, the retainer may be mounted at the inside of the filler pipe so that an upper end thereof is in close contact with the inner circumferential surface of the filler pipe.

In addition, the retainer may be provided with a fuel pump nozzle latching step at a lower end thereof, and when an end of the fuel injection part reaches the fuel pump nozzle latching step, the venturi port of the fuel injection part may directly communicate with the first space through the opening part of the retainer.

In addition, the fuel tank may be provided with a leveling pipe connecting the fuel tank and the filler pipe so that the flow of the fuel evaporation gas is possible, and an end part of the leveling pipe may be disposed at the inside of the fuel tank and may be clogged by contacting the fuel oil surface of the fuel tank when the fuel tank is fully charged.

In addition, the fuel injection part may be configured to stop discharging the fuel when the venturi port is clogged by the fuel flowing back from the fuel tank to the filler pipe.

As described above, the present disclosure prevents the fuel pump nozzle from being shut off prematurely before the fuel tank is fully charged with fuel, so that the fuel pump nozzle can operate ordinarily until the fuel tank is full regardless of the external environment of the fuel tank.

The effects of the present disclosure are not limited to the above-mentioned effects, and other effects of the present disclosure not mentioned should be clearly understood by those having ordinary skill in the art from the following description.

BRIEF DESCRIPTION OF THE DRAWINGS

The above and other objectives, features, and other advantages of the present disclosure should be more clearly understood from the following detailed description when taken in conjunction with the accompanying drawings, in which.

The drawings described herein are for illustration purposes only and are not intended to limit the scope of the present disclosure in any way.

DETAILED DESCRIPTION

In the present disclosure, when a part "includes" a certain component, it means that other components may be further included rather than excluding other components unless otherwise stated.

In addition, in the present disclosure, terms such as first, second, and/or the like may be used to describe various components, but the components are not limited to the above terms. The above terms are used only for the purpose of distinguishing one component from other components, for example, within the scope not departing from the scope of the rights according to the concept of the present disclosure, the first component may be referred to as the second component, and similarly, the second component may also be referred to as the first component.

In addition, when a component is referred to as being "coupled" or "connected" to another component, it should be understood that the component may be directly coupled or connected to another component, but other components may exist in between. On the other hand, when a component is referred to as being "directly connected" or "in direct contact with" another component, it should be understood that no other component is present in between. Other expressions for describing the relationship between elements, that is, expressions such as "between" and "immediately between" or "adjacent to" and "directly adjacent to", should be interpreted similarly.

When a component, device, element, or the like of the present disclosure is described as having a purpose or performing an operation, function, or the like, the component, device, or element should be considered herein as being "configured to" meet that purpose or to perform that operation or function.

Hereinbelow, some embodiments of the present disclosure are described in detail with reference to the accompanying drawings. Matters expressed in the accompanying drawings are schematic drawings to easily explain the embodiments of the present disclosure and may be different from the form actually implemented.

Figure 1:
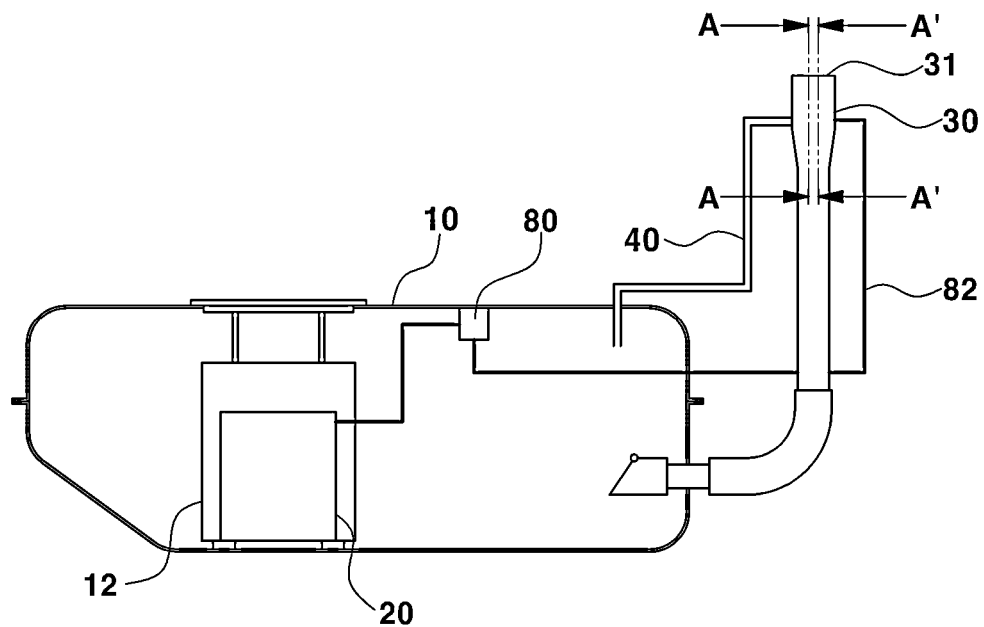
FIG. 1 is a view showing a fuel system of a vehicle to which a system for controlling shut-off of a fuel pump nozzle according to an embodiment of the present disclosure is applied.
Figure 2:
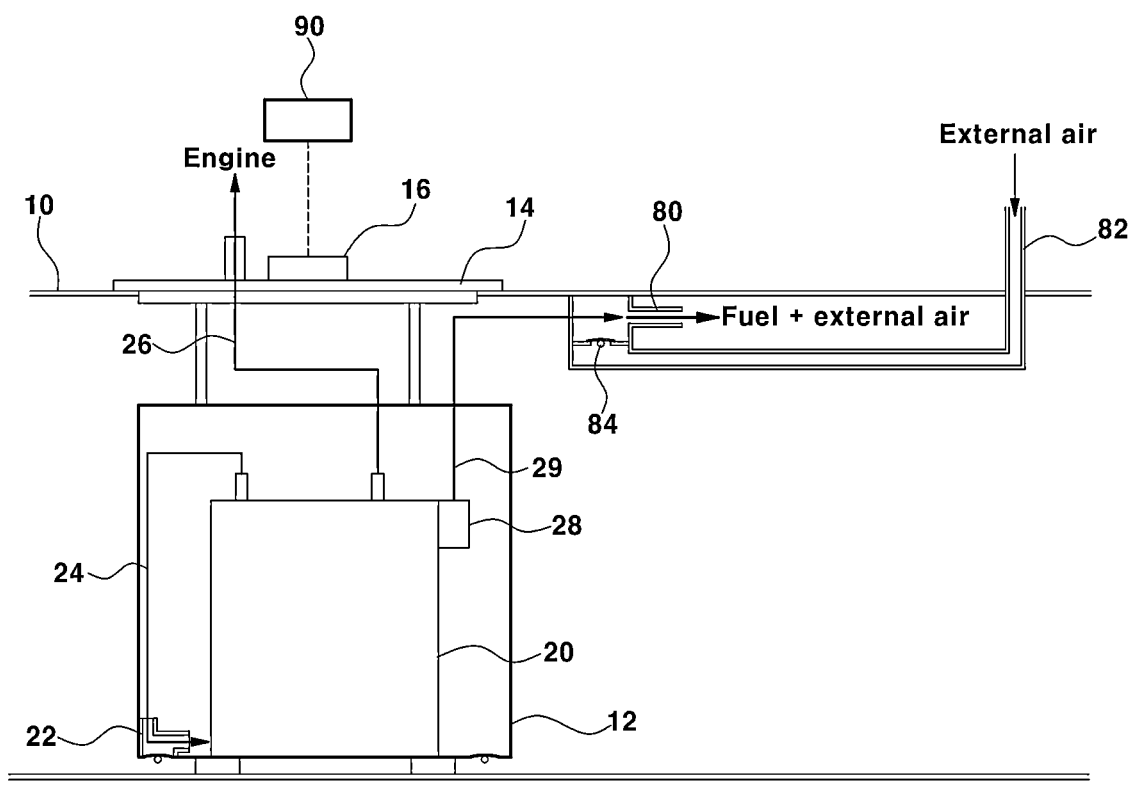
FIG. 2 is a view showing a part of the system for controlling shut-off of a fuel pump nozzle.
Figure 3A:
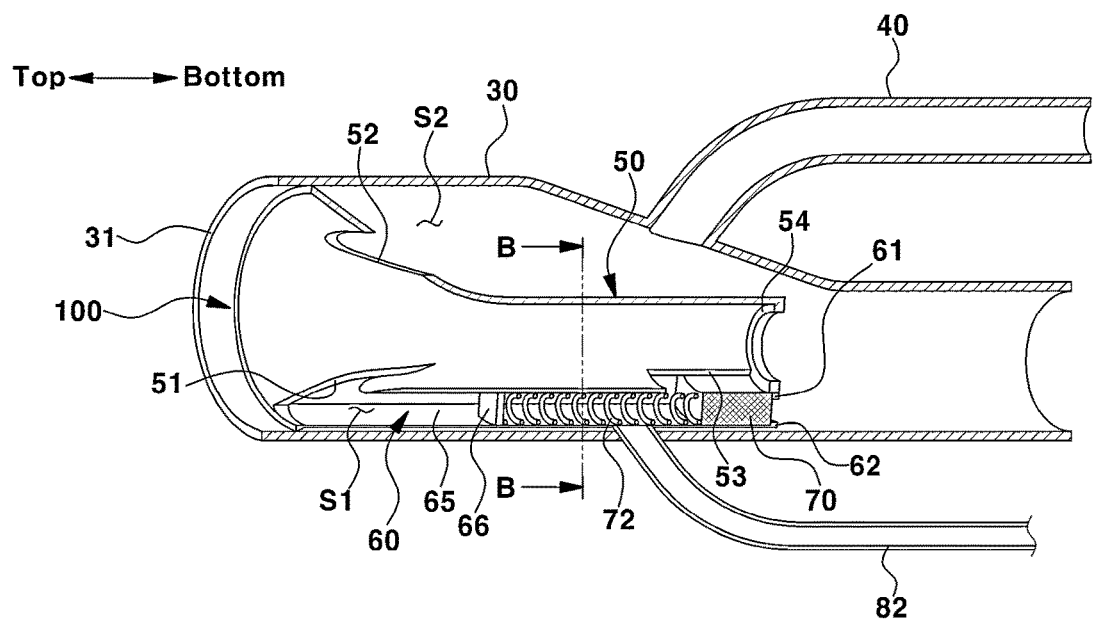
FIG. 3A is a view seen from A-A of FIG. 1.
Figure 3B:
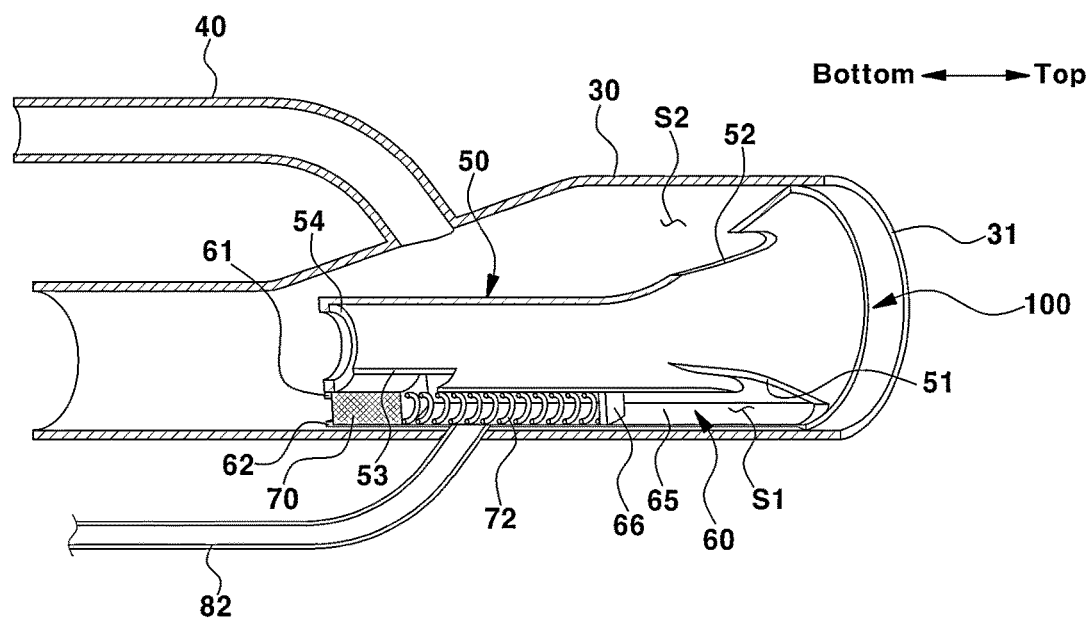
FIG. 3B is a view seen from A'-A' of FIG. 1.
Figure 4:
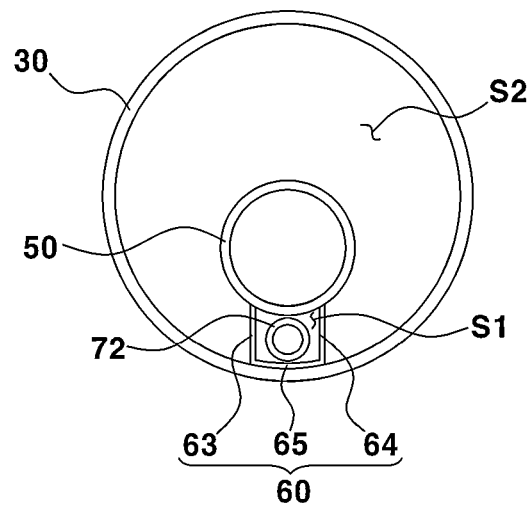
FIG. 4 is a view seen from B-B of FIG. 3A.
Figure 5:
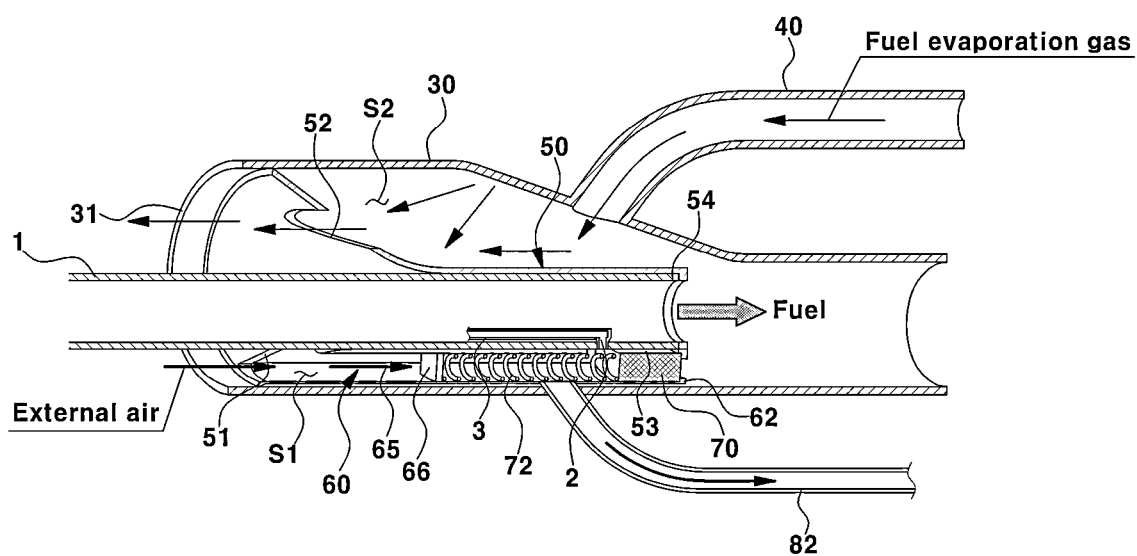
FIG. 5 is a view showing an operating state of the system for controlling shut-off of a fuel pump nozzle before the fuel tank is fully charged.
Figure 6:
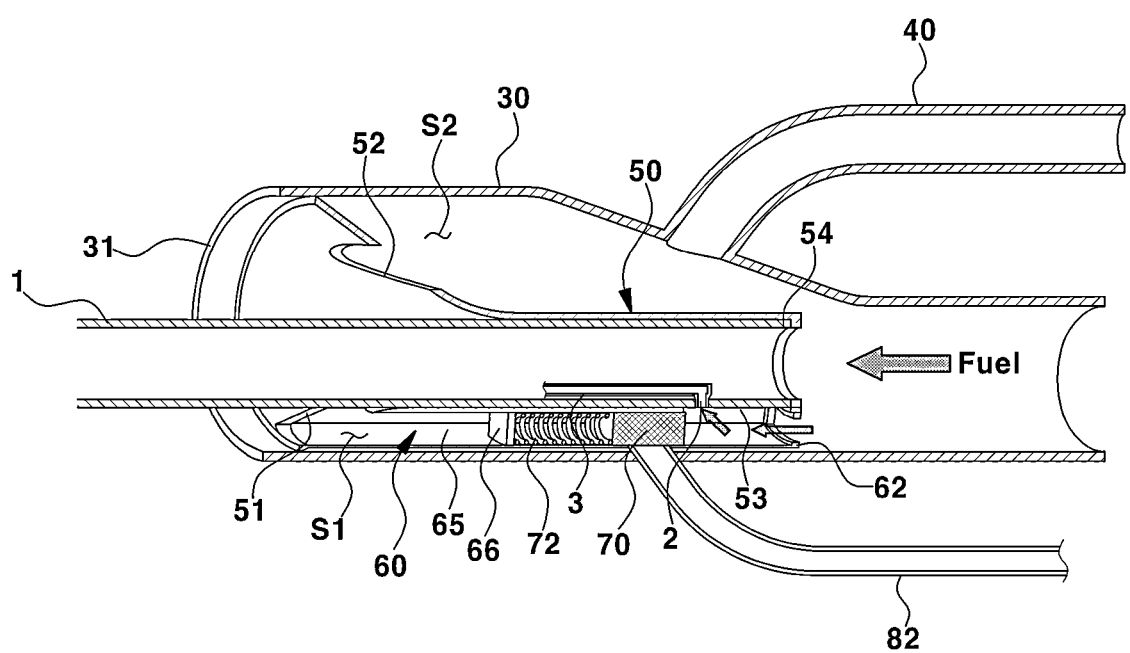
FIG. 6 is a view showing an operating state of the system for controlling shut-off of a fuel pump nozzle when the fuel tank is fully charged.

FIG. 1 is a view showing a fuel system of a vehicle to which a system for controlling shut-off of a fuel pump nozzle according to an embodiment of the present disclosure is applied, FIG. 2 is a view showing a part of the system for controlling shut-off of a fuel pump nozzle; FIG. 3A is a view seen from A-A of FIG. 1, FIG. 3B is a view seen from A'-A' of FIG. 1, FIG. 4 is a view seen from B-B of FIG. 3A, FIG. 5 is a view showing an operating state of the system for controlling shut-off of a fuel pump nozzle before the fuel tank is fully charged, and FIG. 6 is a view showing an operating state of the system for controlling shut-off of a fuel pump nozzle when the fuel tank is fully charged.

As shown in FIG. 1, the fuel system of a vehicle includes: a fuel tank 10 configured to store fuel; a fuel pump 20 configured to transmit the fuel in the fuel tank 10 to an engine; a filler pipe 30 configured to receive the fuel charged into the fuel tank 10; and a leveling pipe 40 configured to relieve an internal pressure of the fuel tank 10.

As shown in FIGS. 1 and 2, the fuel tank 10 is mounted with a reservoir cup 12 therein. The reservoir cup 12 is configured to store the fuel therein by receiving the fuel from the fuel tank 10. The reservoir cup 12 is configured to be charged by receiving the fuel from the fuel tank 10 through a fuel suction jet pump 22 installed therein.

The fuel suction jet pump 22 may be installed on a bottom part of the reservoir cup 12. The fuel suction jet pump 22 is configured to receive a portion of the fuel transmitted by squeeze-pumping from the fuel pump 20 as a working fluid, thereby sucking the fuel in the outside of the reservoir cup 12 (that is, the fuel in the fuel tank 10) to discharge the fuel to the inside of the reservoir cup 12.

The fuel suction jet pump 22 is configured to receive a portion of the fuel discharged from the fuel pump 20 through a jet hose 24. The jet hose 24 is connected to the fuel pump 20 separately from a fuel hose 26 and is configured to receive the portion of the fuel discharged from the fuel pump 20. The fuel hose 26 transmits a portion of the fuel transmitted from the fuel pump 20 to the engine.

In addition, a head plate 14 is mounted on a top side part of the fuel tank 10, and a pump controller 16 configured to control the driving of the fuel pump 20 is mounted on the head plate 14.

The fuel pump 20 is mounted inside the reservoir cup 12 and is configured to transmit the fuel in the reservoir cup 12 to the engine. In the case the fuel transmitted from the fuel pump 20 is not injected into the engine, the internal pressure of the fuel pump 20 increases. The fuel pump 20 is provided with a relief valve 28 to relieve the internal pressure thereof.

The relief valve 28 is actuated to discharge the fuel in the fuel pump 20 to the outside of the fuel pump 20 when the internal pressure of the fuel pump 20 reaches a predetermined maximum pressure. The relief valve 28 is actuated to open the fuel outlet of the fuel pump 20, whereby the internal pressure of the fuel pump 20 is prevented from exceeding the maximum pressure. The relief valve 28 is also referred to as a regulator.

The leveling pipe 40 is connected to the fuel tank 10 and the filler pipe 30 so that the fluid is movable. In other words, the leveling pipe 40 connects the fuel tank 10 and the filler pipe 30 to each other so that the flow of the fuel evaporation gas is possible. That is, the fuel tank 10 and the filler pipe 30 are connected to each other so that the fuel evaporation gas flows through the leveling pipe 40. When refueling the fuel, the fuel evaporation gas generated in the fuel tank 10 is discharged to the filler pipe 30 through the leveling pipe 40.

In addition, a lower end part of the leveling pipe 40 is disposed inside the fuel tank 10 by passing through the top side part of the fuel tank 10. Thus, when the fuel in the fuel tank 10 reaches a predetermined height corresponding to a level of being fully charged, the lower end part comes into contact with the fuel surface and is clogged by the fuel.

In the case the leveling pipe 40 is clogged when refueling the fuel tank 10, the fuel in the fuel tank 10 flows back into the filler pipe 30 as the internal pressure of the fuel tank 10 rises. At this time, the fuel flowing back into the filler pipe 30 shuts off the fuel pump nozzle so that a fuel discharge of the fuel pump nozzle is stopped.

The filler pipe 30 has: an upper part, to which the leveling pipe 40 is connected so that fluid is movable; and a lower part connected to the fuel tank 10 so that fluid is movable. When refueling the fuel tank 10, a fuel injection part 1 of the fuel pump nozzle is inserted into an upper part of the filler pipe 30. When injecting the fuel into the fuel tank 10, the fuel evaporation gas discharged through the leveling pipe 40 is discharged to the outside through the upper part of the filler pipe 30.

Meanwhile, when refueling the fuel tank 10, the fuel pump nozzle generally continuously sucks air through the venturi port 2 provided in the fuel injection part 1 until shut-off occurs. This is to relieve a negative pressure formed inside the fuel pump nozzle when the fuel is discharged from the fuel injection part 1.

As is known, the fuel pump nozzle detects the fuel tank being fully charged using the negative pressure formed therein when discharging the fuel. The fuel pump nozzle relieves the negative pressure by sucking air through the venturi port before the fuel tank is fully charged, and the venturi port is clogged to form the negative pressure when the fuel tank is fully charged, whereby the full charge of the fuel tank is detected. When the fuel tank is fully charged, the fuel of the fuel tank flowing back through the filler pipe clogs the venture port. As a result, the air suction of the fuel pump nozzle through the venturi port is stopped, and the negative pressure inside the fuel pump nozzle is no longer relieved, and thus the fuel pump nozzle is ordinarily shut off.

As shown in FIGS. 5 and 6, the fuel pump nozzle is provided with a venturi port 2 configured to suck external air by the negative pressure generated therein when the fuel is discharged from the fuel injection part 1. The venturi port 2 is provided with a venturi port connection pipe 3 extending to the inside of the fuel injection part 1.

The venturi port 2 relieves the negative pressure generated inside the fuel pump nozzle by sucking in the outside air until the fuel tank 10 is fully charged, thereby preventing the fuel pump nozzle from being shut off before the fuel tank 10 is fully charged. The venturi port 2 is clogged by the fuel flowing back into the filler pipe 30 when the fuel tank 10 is fully charged. At this time, the negative pressure formed inside the fuel pump nozzle is not relieved through the venturi port 2, so the fuel pump nozzle detects that the fuel tank 10 is fully charged and stops the fuel discharge.

On the other hand, when refueling in a situation in which the fuel evaporation gas is excessively generated in the fuel tank 10, in the case that excessive fuel evaporation gas flowing into the filler pipe 30 through the leveling pipe 40 flows into the relatively cold venturi port connection pipe 3 and is condensed, suction of the external air to the fuel pump nozzle through the venturi port 2 is blocked. In this case, the negative pressure inside the fuel pump nozzle is no longer relieved, so there occurs a problem in that the fuel tank 10 is prematurely shut off before the fuel tank 10 is fully charged.

Accordingly, in order to prevent the fuel pump nozzle from being shut off prematurely before the fuel tank 10 is fully charged, as shown in FIGS. 2 to 4, the system for controlling the shut-off of a fuel pump nozzle of the present disclosure is provided with a fuel evaporation gas blocking unit 100 mounted on the filler pipe 30 and an external air suction jet pump 80 mounted on the fuel tank 10.

The system for controlling the shut-off of a fuel pump nozzle is configured to smoothly relieve the negative pressure inside the fuel pump nozzle when refueling even in a high-temperature environment in addition to refueling in a room temperature environment.

As shown in FIGS. 3A and 3B, the fuel evaporation gas blocking unit 100 is mounted at an inside of an upper side portion of the filler pipe 30. The fuel evaporation gas blocking unit 100 is configured to separate an outer side space of the fuel injection part 1 inserted thereinto into a first space S1 into which the external air is introduced and a second space S2 into which the fuel evaporation gas is introduced. In addition, the fuel evaporation gas blocking unit 100 is configured to block the evaporation gas from being introduced into the first space S1.

The fuel evaporation gas blocking unit 100 includes a retainer 50, a partition 60, and a premature shut-off prevention valve 70, which are disposed on an upper side of the filler pipe 30, based on a direction in which the fuel is injected into the filler pipe 30.

The retainer 50 is fixedly mounted at an inside of the upper side portion of the filler pipe 30. In one form, an upper end of the retainer 50 is in airtight contact with the inner circumferential surface of the filler pipe 30.

The retainer 50 serves to support the fuel injection part 1 inserted into the filler pipe 30 not to move. With reference to FIG. 3A, the retainer 50 has an upper side portion formed in a tapered pipe shape and a lower side portion being formed in a pipe shape in close contact with the outer circumferential surface of the fuel injection part 1.

The retainer 50 is formed such that the lower side portion thereof has an inner diameter corresponding to an outer diameter of the fuel injection part 1, thereby grabbing the fuel injection part 1 not to move when the fuel injection part 1 is inserted into the retainer 50. In another form, there may be a fine gap between an inner peripheral surface of the retainer 50 and an outer peripheral surface of the fuel injection part 1 for smooth entering and exiting of the fuel injection part 1.

The retainer 50 is formed such that an end of the upper side portion thereof (that is, an upper end) has the largest outer diameter. The end of the upper side part of the retainer 50 may have an outer diameter capable of being press-fitted into the upper side portion of the filler pipe 30.

When the retainer 50 is mounted on the upper side portion of the filler pipe 30, the upper end thereof is disposed close to the upper end of the filler pipe 30 (that is, a fuel inlet), and the lower end thereof is disposed in a direction lower than an upper end of the leveling pipe 40 connected to the filler pipe 30.

In addition, a fuel pump nozzle latching step 54 is provided on the lower side of the retainer 50, and the end of the fuel injection part 1 is caught to the fuel pump nozzle latching step 54. In one embodiment, the fuel pump nozzle latching step 54 is formed on an inner circumferential surface of the retainer 50 and protrudes inward in a radial direction of the retainer 50. The fuel injection part 1 may be inserted into the retainer 50 until its end is caught on the fuel pump nozzle latching step 54.

In addition, the retainer 50 is provided with an external air suction hole 51 and an evaporation gas venting hole 52 at the upper side portion thereof and is provided with an opening part 53 at a lower side portion thereof, based on a fuel injection direction of the filler pipe 30.

In order to suck the outside air into a space between the inner circumferential surface of the filler pipe 30 and the outer circumferential surface of the retainer 50, the outside air suction hole 51 is provided on the upper side portion of the retainer 50.

The outside air introduced into the inside of the filler pipe 30 and retainer 50 through a fuel injection port 31 of the filler pipe 30 is fed into the space between the filler pipe 30 and the retainer 50 through the outside air suction hole 51. Here, the space between the filler pipe 30 and the retainer 50 may mean an outer side space of the fuel injection part 1 inserted into the retainer 50.

The evaporation gas venting hole 52 is provided on the upper side portion of the retainer 50 so as to release the fuel evaporation gas introduced into the space between the filler pipe 30 and the retainer 50 through the leveling pipe 40 to the outside.

The fuel evaporation gas introduced into the space between the filler pipe 30 and the retainer 50 is discharged to the outside of the filler pipe 30 through the evaporation gas venting hole 52 and the fuel injection port 31.

In order to reduce or minimize mixing of the outside air and the fuel evaporation gas, the outside air suction hole 51 and the evaporation gas venting hole 52 are disposed at positions facing each other based on the circumferential direction of the retainer 50.

In another embodiment, a plurality of external air suction holes 51 and a plurality of evaporation gas venting holes 52 may be provided on the upper side portion of the retainer 50. In particular, the plurality of external air suction holes 51 may be disposed to be spaced apart from each other in the circumferential direction of the retainer 50, and also the plurality of evaporation gas venting holes 52 may also be disposed to be spaced apart from each other in the circumferential direction of the retainer 50.

The opening part 53 provided in the lower side portion of the retainer 50 is configured to serve to open the venturi port 2 of the fuel injection part 1 inserted into the retainer 50.

When the fuel injection part 1 is inserted into the inside of the retainer 50, a lower side portion thereof is surrounded by the lower side portion of the retainer 50. At this time, the lower side portion of the fuel injection part 1 becomes being in a state in which the outer peripheral surface thereof is in contact with the inner peripheral surface of the retainer 50, and the venturi port 2 provided on the lower side portion of the fuel injection part 1 is opened by the opening part 53.

The venturi port 2 directly communicates with the first space S1 through the opening part 53 when the fuel injection part 1 is inserted into the retainer 50.

The opening part 53 may be formed to open the venturi port 2 and a peripheral area of the venturi port 2. The opening part 53 exposes the venturi port 2 to the outside of the retainer 50, thereby allowing the external air introduced into the space between the retainer 50 and the filler pipe 30 to be sucked to the fuel injection part 1 through the venturi port 2.

The opening part 53 is formed in a shape in which one side of the lower side portion of the retainer 50 in the circumferential direction is open. When the fuel injection part 1 is inserted into the retainer 50, the venturi port 2 is disposed at a position facing the opening part 53.

For example, when the fuel injection part 1 is inserted into the retainer 50 until the end thereof reaches the fuel pump nozzle latching step 54 of the retainer 50, the venturi port 2 is disposed at a position facing the opening part 53, thereby communicating with the first space S1.

The opening part 53 is disposed in a direction lower than the outside air suction hole 51 and communicates with the outside air suction hole 51 in order to allow the flow of the outside air to be possible. Specifically, the outside air suction hole 51 and the opening part 53 are disposed in a line parallel to the insertion direction of the fuel injection part 1 with respect to the retainer 50.

The external air introduced into the space between the retainer 50 and the filler pipe 30 (that is, the first space) through the external air suction hole 51 may be sucked into the interior of the fuel injection part 1 through the venturi port 2 open through the opening part 53.

On the other hand, the partition 60 is configured to prevent the fuel evaporation gas flowing into the inside of filler pipe 30 through the leveling pipe 40 from being sucked into the fuel injection part 1 through the venturi port 2.

The partition 60 is provided on the outer circumferential surface of the retainer 50 and is configured to surround the first space S1 of the space between the inner circumferential surface of the filler pipe 30 and the outer circumferential surface of the retainer 50. In this case, edge portions of the partition 60 may be fixed in a state of being in close contact with the outer peripheral surface of the retainer 50.

The first space S1 is a space in which the flow of external air is allowed and the inflow of fuel evaporation gas is blocked. The first space S1 is a closed space in which the opening part 53 and the external air suction hole 51 are communicated with each other in order to allow the flow of external air to be possible. In other words, the first space S1 is the space connecting the external air suction hole 51 and the opening part 53 to allow the flow of external air to be possible.

The partition 60 divides the space defined by the inner circumferential surface of the filler pipe 30 and the outer circumferential surface of the retainer 50 into two spaces: the first space S1 and the second space S2. The second space S2 is a space excluding the first space S1 of the space between the inner circumferential surface of the filler pipe 30 and the outer circumferential surface of the retainer 50. The second space S2 is the space between the inner circumferential surface of the filler pipe 30 and the outer circumferential surface of the retainer 50 and communicates with the evaporation gas venting hole 52 and the leveling pipe 40.

The first space S1 and the second space S2 may be separated by the partition 60 and the premature shut-off prevention valve 70.

The partition 60 is provided with a fuel inlet hole 61 at a lower end thereof. The fuel inlet hole 61 is opened and closed by the premature shut-off prevention valve 70.

The fuel inlet hole 61 is opened when the premature shut-off prevention valve 70 is pushed and moved by the fuel flowing back from the fuel tank 10 to the filler pipe 30.

The fuel inlet hole 61 is maintained in a closed state by the premature shut-off prevention valve 70 before the fuel tank 10 is fully charged and opened by the fuel flowing back from the fuel tank 10 when the fuel tank 10 is fully charged.

When the fuel of the fuel tank 10 that flows back into the filler pipe 30 is introduced into the first space S1 through the fuel inlet hole 61, the venturi port 2 of the fuel injection part 1 becomes clogged by the fuel.

As shown in FIG. 4, the partition 60 may include a first sidewall part 63, a second sidewall part 64, and an outer wall part 65.

The first sidewall part 63 and the second sidewall part 64 are each configured to extend in a radial direction from the outer circumferential surface of the retainer 50. In one embodiment, the first sidewall part 63 and the second sidewall part 64 are disposed at a predetermined distance from each other based on the circumferential direction of the retainer 50. In addition, the first sidewall part 63 and the second sidewall part 64 may be formed to protrude from the outer circumferential surface of the retainer 50 or may be fixedly bonded to the outer circumferential surface of the retainer 50.

The outer wall part 65 is configured to integrally connect an end of the first sidewall part 63 and an end of the second sidewall part 64. In one embodiment, the end of the first sidewall part 63 is the outer end of the first sidewall part 63 based on the radial direction of the retainer 50, and the end of the second sidewall part 64 is also the outer end of the second sidewall part 64 based on the radial direction of the retainer 50. In addition, the outer wall portion 65 may be in close contact with the inner circumferential surface of the filler pipe 30 when the retainer 50 is mounted to the filler pipe 30.

The partition 60, as described above, separates the outer space of the fuel injection part 1 inserted into the inside of the retainer 50 into the first space S1 through which the external air is introduced into and the second space S2 through which the fuel evaporation gas is introduced into and blocks the fuel evaporation gas from flowing into the first space S1.

The premature shut-off prevention valve 70 is configured to close the fuel inlet hole 61 until the fuel tank 10 is fully charged and to open the fuel inlet hole 61 when the fuel tank 10 is fully charged.

The premature shut-off prevention valve 70 is slidably disposed at the inner space of the partition 60 to open and close the fuel inlet hole 61. In other words, the premature shut-off prevention valve 70 is slidably assembled in the first space S1 in a vertical direction. The premature shut-off prevention valve 70 is slidably disposed at the first space S1 while in contact with the inner circumferential surface of the partition 60 and the outer circumferential surface of the retainer 50.

The premature shut-off prevention valve 70 is disposed at the first space S1 in a state of being elastically supported by a spring member 72 to hermetically close the fuel inlet hole 61. The spring member 72 is configured to press the premature shut-off prevention valve 70 toward the fuel inlet hole 61.

The spring member 72 is disposed in a direction above the premature shut-off prevention valve 70 in a state of being mounted on a spring support plate 66. In one embodiment, the spring member 72 is disposed between the spring support plate 66 and the premature shut-off prevention valve 70 in a state of being coupled to each of the spring support plate 66 and the premature shut-off prevention valve 70. At this time, an upper end of the spring member 72 is coupled to the spring support plate 66, and a lower end of the spring member 72 is coupled to the premature shut-off prevention valve 70.

The spring support plate 66 is fixedly mounted to an inner circumferential surface of the outer wall portion 65 of the partition 60 or is fixedly mounted to the outer circumferential surface of the retainer 50. In one embodiment, the spring support plate 66 includes a plate member having a sectional area smaller than that of the first space S1 based on a position at which the spring support plate 66 is disposed. In another embodiment, the spring support plate 66 may include a plate member having an open central portion thereof. Accordingly, the outside air is sucked ordinarily into the first space S1 without being blocked by the spring support plate 66, and the flow of the outside air between the outside air suction hole 51 and the opening part 53 is possible.

In addition, the partition 60 is provided, at the lower end thereof, with a valve latching step 62 configured to support the premature shut-off prevention valve 70. The valve latching step 62 is disposed on an outside of the fuel inlet hole 61. The valve latching step 62 supports the lower end surface of the premature shut-off prevention valve 70 pressed by the spring member 72. Accordingly, the valve latching step 62 prevents the premature shut-off prevention valve 70 from being separated from the partition 60 and the first space S1.

As shown in FIG. 5, the premature shut-off prevention valve 70 is in a state of closing the fuel inlet hole 61 by the spring member 72 before the fuel tank 10 is fully charged.

As shown in FIG. 6, the premature shut-off prevention valve 70 opens the fuel inlet hole 61 by sliding upward by the fuel flowing back from the fuel tank 10 when the fuel tank 10 is fully charged. The premature shut-off prevention valve 70 slides upward while compressing the spring member 72 when the fuel inlet hole 61 is opened.

When the pressure of the fuel applied to the premature shut-off prevention valve 70 is removed, the premature shut-off prevention valve 70 returns to a position to close the fuel inlet hole 61 by the elastic restoring force of the spring member 72.

On the other hand, the upper side portion of the filler pipe 30 is connected to the external air suction jet pump 80 through a jet pump connection hose 82.

As shown in FIGS. 2, 3A, and 3B, the jet pump connection hose 82 connects the first space S1 of the filler pipe 30 and the external air suction jet pump 80 to each other so that the flow of external air is possible.

The external air suction jet pump 80 is mounted on the upper side part of the fuel tank 10 and disposed at an inside of the fuel tank 10. That is, the external air suction jet pump 80 is mounted on a lower surface of the upper side part of the fuel tank 10. Hereinafter, the external air suction jet pump 80 is abbreviated to be referred to as a jet pump 80.

The jet pump 80 is configured to suck the external air thereinto and discharge the external air into the inside of the fuel tank 10, by receiving a portion of the fuel transmitted from the fuel pump 20 as a working fluid. The jet pump 80 sucks the external air thereinto while discharging the fuel supplied from the fuel pump 20 into the inside of the fuel tank 10. The jet pump 80 is configured to suck the external air thereinto through the jet pump connection hose 82.

The jet pump 80 is connected to the relief valve 28 provided in the fuel pump 20 in order to allow the flow of fuel to be possible. The jet pump 80 is configured to receive the fuel discharged from the fuel pump 20 through the relief valve 28 when the relief valve 28 is opened. The jet pump 80 is connected to the relief valve 28 through a valve hose 29.

When discharging the fuel supplied from the fuel pump 20 into the inside of the fuel tank 10, the jet pump 80 becomes to suck the external air thereinto while a negative pressure is formed therein.

The jet pump 80 is provided with a check valve 84 on a bottom surface part thereof. A jet pump connection hose 82 is connected to the bottom surface part of the jet pump 80. The jet pump 80 is connected to the jet pump connection hose 82 in order to allow the flow of external air to be possible through the check valve 84.

In other words, the check valve 84 is installed at a connection portion between the jet pump 80 and the jet pump connection hose 82, and the jet pump connection hose 82 is disposed at a rear end of the jet pump connection hose 82 based on a fluid flow direction of the jet pump connection hose 82. The check valve 84 is configured to allow the external air to be sucked into the jet pump 80 and to block the fuel from flowing out to the jet pump connection hose 82.

In addition, the jet pump connection hose 82 extends passing through the fuel tank 10 in order to communicate with the jet pump 80 disposed at the inside of the fuel tank 10 and the internal space (that is, the first space) of the partition 60 disposed outside the fuel tank 10.

In addition, the fuel pump 20 is driven to open the relief valve 28 when refueling the fuel tank 10, and the check valve 84 is opened when the fuel pump 20 is driven. The relief valve 28 is configured to be selectively opened by the driving pressure of the fuel pump 20.

When refueling the fuel tank 10, the system for controlling shut-off of the fuel pump nozzle configured in this way operates as shown in FIG. 5 before the fuel tank 10 is fully charged and operates as shown in FIG. 6 when the fuel tank 10 is fully charged.

As shown in FIG. 5, when refueling the fuel tank 10, the fuel inlet hole 61 of the partition 60 is kept closed by the premature shut-off prevention valve 70, and the first space S1 is blocked from introducing the fuel evaporation gas thereinto.

At this time, the fuel injection part 1 inserted into the retainer 50 sucks the external air introduced into the first space S1 through the venturi port 2, and the negative pressure of the jet pump 80 acts on the first space S1 through the jet pump connection hose 82, thereby increasing the flow rate of the external air sucked into the first space S1. As the flow rate of the external air sucked into the first space S1 increases, the external air is more smoothly supplied to the venturi port 2.

In addition, the fuel evaporation gas introduced into the second space S2 of the filler pipe 30 through the leveling pipe 40 is discharged to the outside of the filler pipe 30 through the evaporation gas venting hole 52.

At this time, since the first space S1 is in a state of being separated from the second space S2 by the partition 60 and the premature shut-off prevention valve 70, the fuel evaporation gas is not sucked into the fuel injection part 1.

Accordingly, a phenomenon in which the fuel pump nozzle is prematurely shut off before the fuel tank 10 is fully charged is prevented, and the fuel pump nozzle operates ordinarily until the fuel tank 10 is fully charged.

When the fuel tank 10 is fully charged when refueling, as shown in FIG. 6, the premature shut-off prevention valve 70 is pressurized upward by the fuel flowing back into the filler pipe 30.

The premature shut-off prevention valve 70 opens the fuel inlet hole 61 of the partition 60 while being slid in a direction upward by the fuel. At this time, fuel is introduced into the first space S1 through the opened fuel inlet hole 61.

The fuel introduced into the first space S1 comes into contact with the venturi port 2 of the fuel injection part 1 and clogs the venturi port 2, and the fuel pump nozzle is incapable of relieving the internal negative pressure as the venturi port 2 is clogged, thereby being ordinarily shut off.

At this time, the premature shut-off prevention valve 70 moved in a direction upward prevents the fuel introduced into the first space S1 from being discharged to the outside of the filler pipe 30 through the external air suction hole 51. To this end, the premature shut-off prevention valve 70 may be provided with a plate-shaped member or a block-shaped member having a sectional area corresponding to a sectional area of the first space S1.

Figure 7:
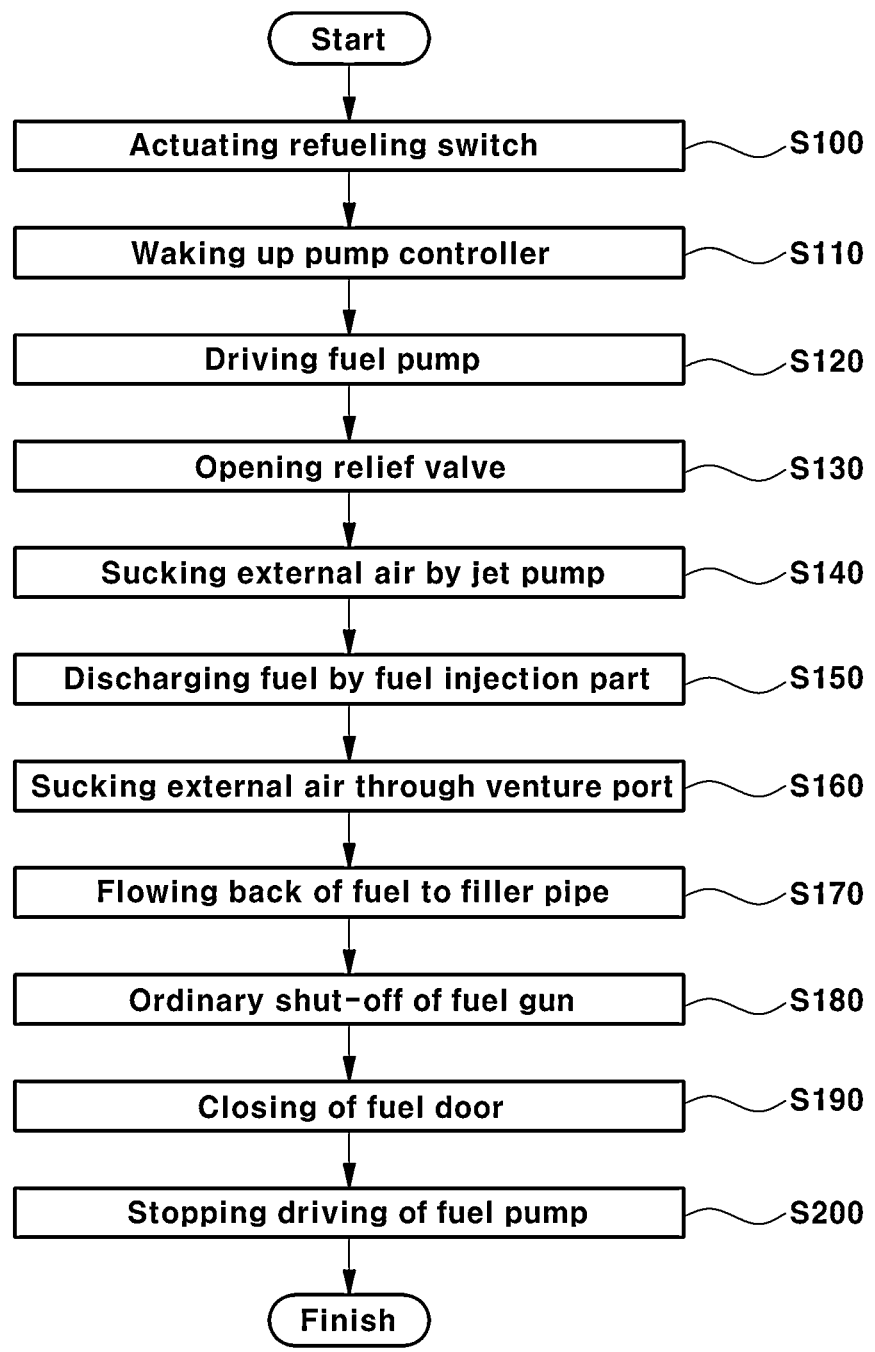
FIG. 7 is a flowchart illustrating an operation process of the system for controlling shut-off of a fuel pump nozzle as an example.

Here, an operation process of the system for controlling shut-off of a fuel pump nozzle according to the embodiment of the present disclosure is described with reference to FIG. 7. FIG. 7 is only an example of an operation process of the system for controlling shut-off of a fuel pump nozzle, and the operation process and operation sequence of the system for controlling shut-off of a fuel pump nozzle are not necessarily limited by FIG. 7.

As shown in FIG. 7, when a fuel switch (see 90 in FIG. 2) is actuated in S100, the pump controller 16 becomes to wake up in S110. The fuel switch 90 may be provided at an inside of inside the vehicle interior to enable user manipulation.

When waken up, the pump controller 16 drives the fuel pump 20 in S120. When waken up linked with the actuation of the fuel switch 90, the pump controller 16 drives the fuel pump 20 so that the relief valve 28 is opened.

When the fuel pump 20 is driven at, at least, a predetermined pressure, the relief valve 28 is opened in S130. For example, the relief valve 28 is opened when the internal pressure of the fuel pump 20 is at least 650 kPa.

At this time, the pump controller 16 may control the fuel pump 20 to transmit the fuel at a pressure of 700 kPa or may drive the fuel pump 20 at 100%.

When the relief valve 28 is opened, the fuel transmitted from the fuel pump 20 is supplied to the jet pump 80 through the relief valve 28. The jet pump 80 sucks the outside air through the jet pump connection hose 82 while discharging the fuel supplied from the fuel pump 20 to the fuel tank 10 in S140.

When the fuel injection part 1 of the fuel pump nozzle is inserted into the retainer 50 and the fuel is discharged from the fuel injection part 1 in S150, the external air is sucked into the fuel injection part 1 through the venturi port 2 in S160.

When the fuel tank 10 is fully charged and the fuel in the fuel tank 10 flows back into the filler pipe 30 S170, while the premature shut-off prevention valve 70 opens the fuel inlet hole 61 of the partition 60, the venturi port 2 is clogged by the fuel and the fuel pump nozzle is ordinarily shut off in S180.

When the fuel injection part 1 is removed from the retainer 50 and the fuel door is closed in S190, the pump controller 16 is shut off, and the driving of the fuel pump 20 is stopped in S200. At this time, the pump controller 16 is shut off when the fuel door remains closed for a predetermined time (for example, 5 seconds).

The fuel door is configured to open and close the fuel injection port 31 of the filler pipe 30 and may be automatically opened when the fuel switch 90 is actuated.

While the embodiments of the present disclosure have been described in detail above, the terms or words used in the present specification and claims should not be construed as being limited to conventional or dictionary meanings. In addition, the scope of the present disclosure is not limited to the above-described embodiments, and various modifications and improvements by those having ordinary skill in the art using the basic concept of the present disclosure are also included in the scope of the present disclosure.

What is claimed is:

1. A system for controlling shut-off of a fuel pump nozzle, the system comprising:
    a fuel evaporation gas blocking unit mounted on a filler pipe of a fuel tank and configured to separate an outer side space of a fuel injection part of the fuel pump nozzle inserted into an inside thereof into a first space into which external air is introduced and a second space into which fuel evaporation gas that is discharged from the fuel tank is introduced and to block the fuel evaporation gas from being introduced into the first space;
    an external air suction jet pump mounted at an inside of the fuel tank and configured to suck external air thereinto and discharge the external air into the inside of the fuel tank, by receiving a portion of fuel transmitted from a fuel pump in the fuel tank as a working fluid; and
    a jet pump connection hose configured to connect the first space and the external air suction jet pump to each other so that a flow of external air is possible.

2. The system of claim 1, wherein the fuel pump is configured to be driven when the fuel tank is refueled and to transmit the fuel to the external air suction jet pump.

3. The system of claim 2, wherein the external air suction jet pump is connected to a relief valve provided in the fuel pump so that a flow of the fuel is possible, and the fuel pump is driven so that the relief valve is opened when a fuel switch is actuated.

4. The system of claim 3, wherein the jet pump connection hose is installed with a check valve at a rear end thereof, and the check valve is opened when the relief valve is opened.

5. The system of claim 1, wherein the fuel evaporation gas blocking unit comprises:
    a retainer, which is mounted at an inside of the filler pipe, and which, based on a fuel injection direction of the filler pipe, is, at an upper part thereof, provided with an external air suction hole configured to suck outside air and an evaporation gas venting hole configured to discharge the fuel evaporation gas and is, at a lower side portion thereof, formed with an opening part configured to communicate with the external air suction hole and configured to open a venturi port of the fuel injection part;
    a partition provided on an outer circumferential surface of the retainer, configured to hermetically surround the first space, configured to communicate with the external air suction hole and the opening part, of a space between an inner circumferential surface of the filler pipe and the outer circumferential surface of the retainer, and provided with a fuel inlet hole at a lower end thereof; and
    a premature shut-off prevention valve assembled at an inside of the partition and configured to close the fuel inlet hole until the fuel tank is fully charged and to open the fuel inlet hole by the fuel flowing back from the fuel tank to the filler pipe when the fuel tank is fully charged.

6. The system of claim 5, wherein the fuel pump nozzle is configured to suck the outside air through the venturi port when the fuel is discharged from the fuel injection part, and the venturi port directly communicates with the first space through the opening part when the fuel injection part is inserted into the retainer.

7. The system of claim 5, wherein the space between the inner circumferential surface of the filler pipe and the outer circumferential surface of the retainer is separated into the first space and the second space by the partition, and the second space is a space configured to communicate with the evaporation gas venting hole of a space between the inner circumferential surface of the filler pipe and the outer circumferential surface of the retainer so that the flow of the fuel evaporation gas is possible.

8. The system of claim 5, wherein the first space is a space configured to communicate with the external air suction hole and the opening part so that the flow of external air is possible.

9. The system of claim 5, wherein the partition is mounted with a spring support plate on an inner circumferential surface thereof, and a spring member is disposed between the spring support plate and the premature shut-off prevention valve to press the premature shut-off prevention valve toward the fuel inlet hole.

10. The system of claim 5, wherein a valve latching step configured to support the premature shut-off prevention valve is provided at a lower end of the partition.

11. The system of claim 9, wherein the spring member is compressed by the premature shut-off prevention valve that moves to allow the fuel inlet hole to be open when the fuel tank is fully charged.

12. The system of claim 5, wherein the external air suction hole and the evaporation gas venting hole are disposed to face each other in a circumferential direction of the retainer.

13. The system of claim 5, wherein the retainer is mounted at the inside of the filler pipe so that an upper end thereof is in close contact with the inner circumferential surface of the filler pipe.

14. The system of claim 5, wherein the retainer is provided with a fuel pump nozzle latching step at a lower end thereof, and when an end of the fuel injection part reaches the fuel pump nozzle latching step, the venturi port of the fuel injection part directly communicates with the first space through the opening part of the retainer.

15. The system of claim 1, wherein the fuel tank is provided with a leveling pipe connecting the fuel tank and the filler pipe so that the flow of the fuel evaporation gas is possible, and
an end part of the leveling pipe is disposed at the inside of the fuel tank and is clogged by contacting a surface of the fuel in the fuel tank when the fuel tank is fully charged.

16. The system of claim 5, wherein the fuel injection part is configured to stop discharging the fuel when the venturi port is clogged by the fuel flowing back from the fuel tank to the filler pipe.

* * * * *